United States Patent [19]

Ikeno

[11] Patent Number: 5,194,554
[45] Date of Patent: Mar. 16, 1993

[54] METHOD OF PRODUCING ONE PART ORGANOPOLYSILOXANE COMPOSITION

[75] Inventor: Masayuki Ikeno, Annaka, Japan

[73] Assignee: Shin-Etsu Chemical Co., Ltd., Tokyo, Japan

[21] Appl. No.: 812,282

[22] Filed: Dec. 23, 1991

[30] Foreign Application Priority Data

Dec. 27, 1990 [JP] Japan .................................. 2-414598

[51] Int. Cl.$^5$ ............................................. C08G 77/06
[52] U.S. Cl. .......................................... 528/15; 528/31; 528/32; 528/24; 525/478
[58] Field of Search ....................... 528/15, 31, 32, 24; 525/478

[56] References Cited

U.S. PATENT DOCUMENTS

| 4,035,355 | 7/1977 | Baney et al. ................... 260/46.5 Y |
| 4,061,609 | 12/1977 | Bobear et al. ............................ 260/9 |
| 4,322,320 | 3/1982 | Caprino ................................. 523/212 |
| 5,036,117 | 7/1991 | Chung et al. ......................... 522/172 |

Primary Examiner—Melvyn I. Marquis
Assistant Examiner—Margaret W. Glass
Attorney, Agent, or Firm—Nixon & Vanderhye

[57] ABSTRACT

The present invention is characterized by producing a one part organopolysiloxane composition by mixing an organohydrogenpolysiloxane, an addition reaction catalyst, and a hydroperoxide (retarding agent), maturing the resulting mixture at a temperature of 0° to 60° C. for 10 hours or more, and then mixing the obtained mixture with an organopolysiloxane that is a base component. According to this method, the viscosity increase of a one part organopolysiloxane composition wherein a hydroperoxide is used as a retarding agent and the curing delay of said composition due to aging can be obviated.

9 Claims, No Drawings

METHOD OF PRODUCING ONE PART ORGANOPOLYSILOXANE COMPOSITION

BACKGROUND OF THE INVENTION

1. Field of the Invention

The present invention relates to a method of producing a one part organopolysiloxane composition having good long-term storage stability at room temperature.

2. Description of the Related Art

Curable organopolysiloxane compositions which contain an organohydrogenpolysiloxane having silicon-bonded hydrogen atoms (Si-H groups) and an organopolysiloxane having aliphatic unsaturated hydrocarbon groups (e.g., vinyl groups) bonded to silicon atoms and use an addition reaction (hydrosilylation) of the Si-H group to the vinyl group or the like are conventionally well known.

Organopolysiloxane compositions prepared by adding various retarding agents to such compositions so that the curing reaction at temperatures around room temperature is suppressed to improve the long-term storage stability and can be cured by heating the composition to facilitate the hydrosilylation when it is to be used are suggested.

For example, as retarding agents of this type, acetylene compounds are disclosed in U.S. Pat. No. 3,445,420 and hydroperoxide compounds are disclosed in U.S. Pat. No. 4,061,609.

However, where an acetylene compound is used as a retarding agent, since it is volatile, a problem arises in the storage stability of the composition in an open system, and the acetylene group may affect the crosslink density to affect adversely the physical properties of the cured product in some cases.

On the other hand, where a hydroperoxide compound is used as a retarding agent, such problems do not arise. However, it is found that there are problems that the viscosity increases immediately after the production of a composition and that curing delay occurs as the period of the storage of the composition becomes longer. If the amount of the retarding agent to be added is increased in order to prevent this viscosity increase phenomenon, the curing delay due to the aging becomes more conspicuous, and in some extreme cases, curing would not even take place at all.

SUMMARY OF THE INVENTION

Therefore, an object of the present invention is to provide a method of producing a one part curable organopolysiloxane composition wherein a hydroperoxide compound is used as a retarding agent and the above-mentioned viscosity increase and curing delay due to the aging are prevented effectively.

According to the present invention, there is provided a method of producing a one part organopolysiloxane composition by mixing uniformly:

(a) an organopolysiloxane having 0.1 or more silicon-bonded alkenyl groups in the molecule on average,
(b) an organohydrogenpolysiloxane having two or more silicon-bonded hydrogen atoms in the molecule,
(c) an addition reaction catalyst, and
(d) a compound that has at least one hydroperoxy group in the molecule and serves as a retarding agent (which compound is hereinafter referred to as a retarding compound), comprising the steps of mixing the organohydrogenpolysiloxane (b), the addition reaction catalyst (c), and the retarding compound (d), maturing the mixture thus obtained at least for 10 hours under conditions having a temperature of 0° to 60° C., and then adding the organopolysiloxane (a).

According to the present invention, it is possible that the problems of viscosity increase and curing delay peculiar to the conventional one Parr room temperature curable organopolysiloxane compositions wherein a hydroperoxy group containing compound is blended as a retarding agent can be obviated and the effect of the retarding agent can be exhibited satisfactorily.

The organopolysiloxane composition produced in accordance with the present invention has long-term storage stability due to the satisfactory effect of the retarding agent and exhibits, even after stored for a long period of time, the same curability as that exhibited immediately after the production.

DETAILED DESCRIPTION OF THE INVENTION

(A) ORGANOPOLYSILOXANES

The organopolysiloxane, that is, the component (a) used in the present invention has a silicon-bonded alkenyl group(s) in the molecule and an example thereof is an organopolysiloxane having the following average composition formula (1):

$$(R^1)_a(R^2)_b SiO_{(4-a-b)/2} \tag{1}$$

wherein $R^1$ represents an alkenyl group, $R^2$ represents an unsubstituted or substituted monovalent hydrocarbon group except aliphatic unsaturated groups, a is a number such that $0<a<3$, and b is a number such that $0<b<3$, provided that $0<a+b<4$.

In the above average composition formula (1), preferably the alkenyl group $R^1$ has 2 to 8 carbon atoms and includes, for example, a vinyl group, an allyl group, a 1-butenyl group, and a 1-hexenyl group. The alkenyl group present in the molecule is 0.1 or more, preferably 0.4 to 2, in number on average. If the number of the alkenyl group is less than 0.1, the number of the organopolysiloxane molecules not involving in the crosslinking reaction increases and therefore, for example, the crosslink density lowers disadvantageously.

The monovalent hydrocarbon group $R^2$ includes an unsubstituted or substituted monovalent hydrocarbon group generally having 1 to 10 carbon atoms, preferably 1 to 8 carbon atoms, for example, an alkyl group such as a methyl group, an ethyl group, a propyl group, an isopropyl group, a butyl group, and an octyl group; a cycloalkyl group such as a cyclopentyl group, a cyclohexyl group, and a cyclobutyl group; an aryl group such as a phenyl group, a tolyl group, a xylyl group, and a naphthyl group; an aralkyl group such as a benzyl group, a phenylethyl group, and a phenylpropyl group; groups formed by replacing part or all of the hydrogen atoms of these groups by a halogen atom(s) such as a chlorine atom(s), a fluorine atom(s), and a bromine atom(s) or a cyano group(s), e.g., halogenated hydrocarbon groups including a chloromethyl group, a trifluoropropyl group, a chlorophenyl group, a dibromophenyl group, a tetrachlorophenyl group, and a difluorophenyl group; and a cyanoalkyl group such as a β-cyanoethyl group, a γ-cyanopropyl group, and a β-cyanopropyl group. Two $R^2$ may bond together to form a lower alkylene group such as an ethylene group, a trimethylene group, a methylmethylene group, a tetramethylene group, and a hexamethylene group.

The above organopolysiloxane may be a linear, branched, cyclic, or network organopolysiloxane or a mixture of these.

Preferably the viscosity of the organopolysiloxane (a) is generally in the range of 50 to 100,000 cP at 25° C. so that the obtained composition may have a suitable fluidity before the curing and may exhibit stable physical properties after the curing.

(B) ORGANOHYDROGENPOLYSILOXANES

The organohydrogenpolysiloxane, that is, the component (b) has at least two silicon-bonded hydrogen atoms in the molecule and serves as a crosslinking agent. That is, these Si-H groups in the molecule add to the alkenyl groups in the organopolysiloxane (a) to form crosslinks thereby forming an elastic cured product.

An example of the organohydrogenpolysiloxane is an organohydrogenpolysiloxane having the following average composition formula (2):

$$(R^3)_c(H)_d SiO_{(4-c-d)/2} \quad (2)$$

wherein $R^3$ represents an unsubstituted or substituted monovalent hydrocarbon group except aliphatic unsaturated groups, c is a number such that $0<c\leq3$, and d is a number such that $0<d\leq2$, provided that $0<c+d<4$.

In the average composition formula (2), specific examples of the monovalent hydrocarbon group $R^3$ include those groups mentioned for $R^2$ in the above average formula (1).

The organohydrogenpolysiloxane may be a linear, branched, cyclic, or network organohydrogenpolysiloxane or a mixture of these. The viscosity thereof is desirably in the range of 1,000 cP or less at 25° C. in view, for example, of the economy at the time of the production.

The organohydrogenpolysiloxane is desirably used in such an amount that the number of the Si-H groups is 0.5 to 4.0, particularly 0.8 to 1.5, per alkenyl group contained in the organopolysiloxane (a). If the number of the Si-H groups is less than 0.5, the amount of the organohydrogenpolysiloxane (b) that does not take part in the crosslinking becomes large thereby inclining to impair the physical properties of the cured product. Further if the number of the Si-H groups is greater than 4.0, there is a fear that the excess Si-H groups cause the formation of bubbles at the time of curing.

(C) ADDITION REACTION CATALYSTS

The addition reaction catalyst, that is, the component (c) is used to facilitate the reaction between the alkenyl group in the component (a) and the hydrosilyl group (Si-H group) in the component (b) and for example use is made of a platinum family metal catalyst, specifically, elemental platinum, chloroplatinic acid, a platinum/olefin complex, a platinum/alcohol complex, a platinum coordination compound, tetrakis(triphenylphosphine)palladium, or chlorotris(triphenylphosphine)rhodium with preference given to a platinum catalyst.

The amount of the component (c) to be added is 1 ppm or more, preferably 3 to 100 ppm, based on the component (a). If the amount is less than 1 ppm, the component (c) cannot serve as a catalyst effectively while if the amount exceeds 100 ppm, not only remarkable improvement in curing characteristics is not expected but it is economically disadvantageous.

(D) RETARDING COMPOUNDS

In the present invention, as a retarding compound, a compound containing at least one hydroperoxy group (—COOH group) in the molecule is used. This retarding compound suppresses the curing reaction to improve the long-term storage stability of the composition.

Quite a lot of hydroperoxy group containing compounds are known and in the present invention all of these known hydroperoxy group containing compounds can be used as a retarding compound. Specific examples, which are not meant to limit the present invention, are methyl ethyl ketone peroxide, cyclohexanone peroxide, 3,3,5-trimethylcyclohexanone peroxide, methylcyclohexanone peroxide, t-butyl hydroperoxide, cumene hydroperoxide, diisopropylbenzene hydroperoxide, p-methane hydroperoxide, 2,5-dimethylhexane-2,5-dihydroperoxide, and 1,1,3,3-tetramethylbutyl hydroperoxide, which can be used singly or as a mixture of two or more. In the present invention, methyl ethyl ketone peroxide is most preferably used.

In the present invention, the retarding compound is generally in such an amount of 0.0001 to 10 % by weight based on the amount of the curable composition, and particularly in this range the retarding compound is preferably used in an amount ranging from 2 to 200 equivalents to the chemical equivalent of the catalyst metal of the component (c) (platinum in the case of a platinum catalyst). If the amount of the added retarding compound is excessive, the thermal stability of the composition is impaired and it is economically disadvantageous, whereas if the amount of the added retarding compound is too small, the suppressing effect on the curing reaction is not satisfactory and the storage stability of the composition lowers.

OTHER INGREDIENTS

In the present invention, in order to control or modify, for example, the fluidity of the composition or the hardness of the cured product obtainable from the composition a silicone oil such a dimethylpolysiloxane and gum can, for example, be used. Depending on the application of the composition, an inorganic filler can be added to adjust the mechanical strength. Such an inorganic filler includes, for example, fumed silica, silica aerogel, precipitated silica, ground lime, diatomaceous earth, iron oxide, titanium oxide, calcium carbonate, magnesium carbonate, zinc carbonate, alumina, aluminum nitride, boron nitride, silver powder, carbon black, graphite, and glassy carbon.

Further, for example, for coloring, various dyes such as anthraquinone dyes and azo dyes can also be used.

The amounts of the above ingredients to be used are suitably determined depending on the purpose of the application within the range wherein the object of the present invention for securing the storage stability of the curable composition is not impaired.

PRODUCTION OF THE CURABLE COMPOSITION

In the present production method, first, prescribed amounts of the above organohydrogenpolysiloxane (b), the addition reaction catalyst (c), and the retarding compound (d) are mixed uniformly. This mixing can be carried out easily by using a commonly used mixer. The mixing temperature is generally 0° to 60° C. In this mixing, if desired, an organic solvent such as toluene and xylene or a silicone oil such as a dimethylpolysiloxane may be used as a diluent. Further, an optional ingredient such as a filler can be mixed simultaneously.

According to the present invention, then, the thus prepared mixture is matured. The production of a curable composition through this maturing makes it effectively possible to obviate problems including the viscosity increase and the curing delay of the composition that arise from the use of the retarding compound, that is, the component (d). It is required that the maturing is carried out at least for 10 hours, preferably for 10 to 120 hours. If the maturing time is less than 10 hours, problems including the curing delay cannot effectively be obviated. Further the maturing is carried out at a temperature of 0° to 60° C., preferably 5° to 40° C., and most preferably 5° to 30° C.

After the completion of the maturing, a prescribed amount of the organopolysiloxane (a) is uniformly mixed with the above mixture to obtain the intended curable composition. Also, in this mixing stage, if required, any of the above ingredients, etc. can be added and the mixing conditions, etc. may be the same as those of the previous mixing.

THE CURABLE COMPOSITION

When the thus produced one part organopolysiloxane composition is heated generally to a temperature of 100 to 150° C., it cures to form an elastic cured product. Although the curing time varies depending on the heating temperature, generally the curing time is of the order of 30 min to 2 hours.

This composition is excellent in long-term storage stability and exhibits, after the storage, substantially the same curability as that shown immediately after the production.

This composition produced according to the present method is used in various fields, for example, as an adhesive and a sealing agent.

EXAMPLES

In the following Examples, all the parts represent parts by weight and the value of viscosity was measured at 25° C.

EXAMPLE 1

0.7 part of an organohydrogenpolysiloxane consisting of 62.2 mol % of dimethylsiloxane units, 35.4 mol % of trimethylsiloxy units, and 2.4 mol % of methylhydrogensiloxy units and having a viscosity of 100 cP, 0.05 part of a chloroplatinic acid/vinylsiloxane complex (containing 1% by weight of platinum), 0.01 part of methyl ethyl ketone peroxide, and 1.24 parts of a dimethylsilicone oil (KF96 100 manufactured by Shin-Etsu Chemical Co. Ltd.) as a diluent were mixed followed by maturing at 25° C. for 24 hours.

Then 2 parts of the matured mixture and 100 parts of an organopolysiloxane consisting of 99 mol % of dimethylsiloxane units, 0.30 mol % of dimethylvinylsiloxy units and 0.70 mol % of trimethylsiloxy units were mixed to prepare a curable composition.

The viscosity of the obtained composition and the hardness of the cured produced obtained from that composition were measured immediately after the preparation (that is, in the initial stage) and after storing the composition at 60° C. for 7 days.

Curing conditions were at 105° C. for 2 hours and the hardness was given in terms of the penetration (¼ Scale Cone) according to ASTM D1403. The results are shown in Table 1.

COMPARATIVE EXAMPLE 1

Example 1 was repeated, except that the dimethylsilicone oil was not used, all the components were mixed at the same time, and maturing was not carried out, thereby preparing a curable composition. The physical properties of the curable composition were measured and the results are shown in Table 1.

COMPARATIVE EXAMPLE 1

0.05 part of a chloroplatinic acid/vinylsiloxane complex (containing 1% by weight of platinum), 0.01 part of methyl ethyl ketone peroxide ( Permek N manufactured by Nippon Oils and Fats Co., Ltd.), and 1.94 parts of a dimethylsilicone oil were mixed followed by maturing at 25° C. for 24 hours.

Then 2 parts of the matured mixture was mixed with 100 parts of the same organopolysiloxane as that used in Example and 0.7 part of the same organohydrogenpolysiloxane as that used in Example 1 thereby preparing a curable composition. The physical properties of the obtained composition were measured in the same way as that in Example 1 and the results are shown in Table 1.

EXAMPLE 2

Example 1 was repeated, except that the amount of the methyl ethyl ketone peroxide was 0.005 part and the amount of the dimethylsilicone oil was 1.245 parts to prepare a curable composition and the physical properties thereof were measured. The results are shown in Table 1.

TABLE 1

|  |  | Example | | Comparative Example | |
|---|---|---|---|---|---|
|  |  | 1 | 2 | 1 | 2 |
| In the initial stage | Viscosity (cP) | 750 | 750 | 1500 | 760 |
|  | Hardness | 85 | 83 | 83 | 85 |
| After storage for 7 days at 60° C. | Viscosity (cP) | 800 | 1050 | 3000 | 1600 |
|  | Hardness | 85 | 85 | — | — |

In Comparative Examples 1 and 2, curing did not take place.

We claim:
1. A method of producing a one part organopolysiloxane composition by mixing uniformly:
    (a) an organopolysiloxane having 0.1 or more silicon-bonded alkenyl groups in the molecule on average,
    (b) an organohydrogenpolysiloxane having two or more silicon-bonded hydrogen atoms in the molecule,
    (c) an addition reaction catalyst, and
    (d) a retarding compound having at least one hydroperoxy group in the molecule,
comprising the steps of mixing the organohydrogenpolysiloxane (b), the addition reaction catalyst (c), and the retarding compound (d), maturing the mixture thus obtained at least for 10 hours under conditions having a temperature of 0° to 60° C., and then adding the organopolysiloxane (a).

2. A method as claimed in claim 1, wherein said maturing is carried out at 5° to 40° C. for 10 to 120 hours.

3. A method as claimed in claim 2, wherein said maturing is carried out at 5° to 30° C.

4. A method as claimed in claim 1, wherein said organopolysiloxane (a) has the following average composition formula (1):

 (1)

wherein $R^1$ represents an alkenyl group, $R^2$ represents an unsubstituted or substituted monovalent hydrocarbon group except aliphatic unsaturated groups, a is a number such that $0<a<3$, and b is a number such that $0<b<3$, provided that $0<a+b<4$, and a viscosity in the range of 50 to 100,000 cP at 25° C.

5. A method as claimed in claim 1, wherein said organohydrogenpolysiloxane (b) has the following average composition formula (2):

 (2)

wherein $R^3$ represents an unsubstituted or substituted monovalent hydrocarbon group except aliphatic unsaturated groups, c is a number such that $0<c\leq 3$, and d is a number such that $0<d\leq 2$, provided that $0<c+d<4$, and a viscosity of 1,000 cP or less at 25° C.

6. A method as claimed in claim 1, wherein said organohydrogenpolysiloxane (b) is used in such an amount that the number of its Si-H groups is 0.5 to 4 per alkenyl group in the component (a).

7. A method as claimed in claim 1, wherein said addition reaction catalyst is a platinum family metal catalyst.

8. A method as claimed in claim 1, wherein said retarding compound is at least one selected from the group consisting of methyl ethyl ketone peroxide, cyclohexanone peroxide, 3,3,5-trimethylcyclohexanone peroxide, methylcyclohexanone peroxide, t-butyl hydroperoxide, cumene hydroperoxide, diisopropylbenzene hydroperoxide, p-methane hydroperoxide, 2,5-dimethylhexane-2,5-dihydroperoxide, and 1,1,3,3-tetramethylbutyl hydroperoxide.

9. A method as claimed in claim 8, wherein said retarding compound is used in an amount of 0.0001 to 10 % by weight based on the total, amount of the composition.

* * * * *